United States Patent
Nomoto et al.

(10) Patent No.: US 6,523,721 B1
(45) Date of Patent: Feb. 25, 2003

(54) POWDER AND GRANULAR MATERIAL SUPPLY SYSTEM FOR CLOSED SYSTEM

(75) Inventors: Hiroki Nomoto, Kobe (JP); Kenichiro Murata, Kakogawa (JP); Mitsuharu Kishimoto, Hyogo-Ken (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/959,076
(22) PCT Filed: Apr. 30, 1999
(86) PCT No.: PCT/JP99/02342
§ 371 (c)(1), (2), (4) Date: Oct. 18, 2001
(87) PCT Pub. No.: WO00/66466
PCT Pub. Date: Nov. 9, 2000
(51) Int. Cl.$^7$ .............................................. G01G 13/00
(52) U.S. Cl. ......................... 222/77; 222/129; 222/152; 222/415
(58) Field of Search ........................... 222/77, 129, 148, 222/152, 185.1, 415

(56) References Cited

U.S. PATENT DOCUMENTS

| | | | | |
|---|---|---|---|---|
| 4,383,547 | A | * 5/1983 | Lorenz et al. | 222/148 |
| 4,475,669 | A | 10/1984 | Wahl | 222/55 |
| 4,554,942 | A | * 11/1985 | Williams et al. | 222/148 |
| 4,733,891 | A | * 3/1988 | Cervinka | 222/415 |
| 5,148,943 | A | * 9/1992 | Moller | 222/77 |
| 5,161,714 | A | * 11/1992 | Neumann et al. | 222/77 |
| 5,163,584 | A | * 11/1992 | Huber et al. | 222/148 |
| 6,273,665 | B1 | * 8/2001 | Homer, III | 222/415 |

FOREIGN PATENT DOCUMENTS

| | | |
|---|---|---|
| JP | 48-80405 | 10/1973 |
| JP | 49-2279 | 1/1974 |
| JP | 51-123864 U | 4/1975 |
| JP | 54-129684 | 10/1979 |
| JP | 56-132234 U | 3/1980 |
| JP | 58-95037 | 6/1983 |
| JP | 59-90635 | 5/1984 |
| JP | 59-105225 U | 7/1984 |
| JP | 60-249798 | 12/1985 |
| JP | 61-277517 | 12/1986 |
| JP | 63-104407 U | 7/1988 |
| JP | 1-103632 U | 7/1989 |
| JP | 4-171040 | 6/1992 |
| JP | 5-215595 | 8/1993 |
| JP | 7-34106 | 2/1995 |
| JP | Y2 7-34023 | 8/1995 |
| JP | 7-304511 | 11/1995 |

* cited by examiner

*Primary Examiner*—Joseph A. Kaufman
(74) *Attorney, Agent, or Firm*—Oliff & Berridge, PLC

(57) ABSTRACT

A granular material supply system has a granular material supply unit and a granular material feed unit. The granular material supply unit delivers a granular material through an inlet formed in a pressure case included in the granular material feed unit onto a conveying device disposed in the pressure case. The conveying device conveys the granular material to an outlet formed in the pressure case to feed the granular material through the outlet into a granular material using apparatus. The granular material supply unit, and the pressure case of the granular material feed unit can be immovably installed. Therefore the granular material supply system can be formed in a closed system without placing any special joints, such as expansion joints, in a line connecting the granular material supply unit and the pressure case and in a line connecting the pressure case and the granular material using apparatus. Only the conveying device needs to be disposed in the pressure case. Thus the granular material supply system is very simple and small in construction and is not very tall, which is advantageous in space for installation and equipment investment.

17 Claims, 6 Drawing Sheets

POWDER AND GRANULAR MATERIAL SUPPLY SYSTEM FOR CLOSED SYSTEM

TECHNICAL FIELD

The present invention relates to a granular material supply system for a closed system and, more particularly, to a granular material supply system including a pressure case, a conveying means disposed in the pressure case, and a weighing means for weighing the granular powder being conveyed by the conveying means when necessary, and combined with a delivery unit for delivering granular powder supplied thereto by a granular powder supply unit.

BACKGROUND ART

Various plants including smelting reduction steelmaking plants, direct reduction steelmaking plants, coal gasification plants and vacuum degassing plants produce a poisonous gas or an inflammable gas or supplies a poisonous gas or an inflammable gas into a reaction furnace. Such a plant uses a granular material supply system capable of supplying a granular material into the reaction furnaces without opening the plant into the environment.

The inventors of the present invention proposed a granular material supply system 100 to be applied to a smelting reduction steelmaking plant. As shown in FIG. 8, this previously proposed granular material supply system 100 includes, as principal components, a granular material loading unit 101, a granular material supply hopper 102, a vibrating feeder 103, load cells 104 for weighing the granular material supply hopper 102 containing a granular material, and a chute 105. The granular material, such as granular powder iron ore or coal, is loaded through the granular material loading unit 101 into the granular material supply hopper 102, the granular material supply hopper 102 containing the granular material is weighed, the vibrating feeder 103 carries the granular material to the chute 105, and then the granular material is supplied through the chute 105 into a processing unit, such as a furnace.

In the granular material supply system 100, a loading line 110 provided with a stop valve 111 and a metal expansion joint 112 connects the granular material loading unit 101 and the granular material supply hopper 102, a discharge line 113 provided with a rubber expansion joint 114 connects the granular material supply hopper 102 and the vibrating feeder 103, and a feed line 115 provided with a rubber expansion joint 116 and a stop valve 117 connects the vibrating feeder 103 and the chute 105.

The load cells 104 weigh the sum of the weight of the granular material supply hopper 102 and that of the granular material contained in the granular material supply hopper 102. Therefore the metal expansion joint 112 is indispensable and the load cells 104 need to support the granular material supply hopper 102. The vibrating feeder 103 has one end part held through the rubber expansion joint 114 by the granular material supply hopper 102. The rubber expansion joints 114 and 116 absorb vibrations of the vibrating feeder 103. A gas line 121 provided with an equalizing valve 120 has one end connected to the granular material supply hopper 102 and the other end connected to the vibrating feeder 103. When weighing the granular material supply hopper 102 and the granular material contained in the granular material supply hopper 102, the respective pressures in the granular material supply hopper 102 and the vibrating feeder 103 are equalized to prevent the reduction of weighing accuracy.

When supplying a granular material from a granular material supply hopper 130 through chutes 133 and 134 to two granular material receiving units 131 and 132 at a fixed distance of, for example, about 40 m, the chutes 133 and 134 must be inclined at a fixed inclination to a horizontal plane of, for example about 50° to enable the granular material to fall smoothly through the chutes 133 and 134. Consequently, the granular material supply hopper 130 must be installed on a level at several tens meters, for example, about 50 m, above the ground.

In a granular material weighing and conveying system disclosed in JP-U No. Hei 7-34023, a weighing tank is supported on a load cell, a base placed on a fixed body is supported on a bellows under the weighing tank, the bellows and the weighing tank are connected by a pressure line and the pressure in the weighing tank is regulated by an equalizing valve to weigh the granular material by the load cell so that weighing accuracy may not be reduced.

A fixed-quantity granular material feed method disclosed in JP-A No. Sho 54-129684 weighs a granular material while the same is being conveyed from a plurality of granular material storage tanks by belt conveyors. This method is not intended for feeding a granular material to a pressure unit without opening a closed system to the external environment.

The aforesaid granular material supply system 100 needs the metal expansion joint to weight the granular material supply hopper 102 containing the granular material, needs the rubber expansion joints 114 and 116 to absorb the vibrations of the vibrating feeder 103 and needs the gas line 121 provided with the equalizing valve 120 to prevent the reduction of weighing accuracy. Consequently, the granular material supply system 100 is complicated in construction, is large and requires large equipment investment.

Measurement of the sum of the weight of the granular material supply hopper 102 and that of the granular material contained in the granular material supply hopper 102 reduces weighing accuracy. Particularly, weighing error is very large when the capacity of the granular material supply hopper 102 large. For example, if the capacity of the granular material supply hopper 102 is 500 tons and weighing accuracy is 0.5%, weighing error is as large as 2.5 tons. The vibrations of the vibrating feeder 103 reduce weighing accuracy.

The rubber expansion joints 114 and 116 must be capable of withstanding vibrations exerted thereon by the vibrating feeder 103 to prevent the leakage of gases from the granular material supply system. However, it is impossible to prevent the leakage of gases through the rubber expansion joints 114 and 116 perfectly. The use of rubber expansion joints 114 and 116 deficient in durability causes serious problems particularly when the gases are inflammable or poisonous.

When supplying a granular material from the single granular material supply hopper 130 to the two furnaces 131 and 132 as shown in FIG. 9, the granular material supply hopper 130 must be installed on a high level and the chutes 133 and 134 connecting the granular material supply hopper 130 to the two furnaces 131 and 132 are very long. Consequently, this granular material supply system including the chutes 133 and 134 needs a large space for installation and a very large equipment investment.

DISCLOSURE OF THE INVENTION

It is an object of the present invention to simplify the construction of a granular material supply system for a closed system, to enhance the weighing accuracy of the granular material supply system, to enhance the airtightness of the granular material supply system, to reduce the size of the granular material supply system and space for installation and to enhance the economical advantage of the granular material supply system.

According to a first aspect of the present invention, a granular material supply system for supplying a granular material to a granular material using apparatus included in a closed system without opening the closed system to the external environment comprises a granular material supply unit holding a granular material, and a granular material feed unit that receives the granular material from the granular material supply unit and feeds the same, wherein the granular material feed unit includes a pressure case provided with an inlet connected to the granular material supply unit and an outlet for feeding the granular material, and a conveying means disposed in the pressure case to convey the granular material received through the inlet to the outlet.

The conveying means may be a belt conveyor, the pressure case may be a pressure vessel, and the conveying means may be provided with a weighing means for weighing the granular material.

The granular material supply system is capable of supplying the granular material to the granular material using apparatus without opening the closed system to the external environment. Therefore, the granular material supply system is applicable to various plants including smelting reduction steelmaking plants, direct reduction steelmaking plants, coal gasification plants and vacuum degassing plants.

The belt conveyor is disposed in the pressure case, the granular material is supplied from the granular material supply unit through the inlet into the pressure case, and the granular material is conveyed by the belt conveyor to the outlet and is supplied through the outlet into the granular material using apparatus.

Whereas the prior art granular material supply system needs to measure the sum of the weight of the granular material supply hopper 102 and the granular material contained in the granular material supply hopper 102, the granular material supply system of the present invention does not need to do so and the weight of the granular material can be measured in the pressure case. Therefore the pressure case may be immovable, any special joints, such as expansion joints, are not necessary for connecting the inlet and the outlet of the pressure case to the granular material supply unit and the granular material using apparatus, respectively. Consequently, the granular material supply system is very simple in construction and the leakage of gases through the joints can be perfectly prevented. The use of the belt conveyor for conveying the granular material reduces vibration and noise greatly. Granular material feed rate can be adjusted by adjusting the conveying speed of the conveying means and the supply of the granular material into the granular material using apparatus can be stopped by stopping the conveying means.

In the granular material supply system according to the first aspect of the present invention, the conveying means may include a belt conveyor. The simple and small construction of the belt conveyor are advantages of the belt conveyor when disposing the belt conveyor in the pressure case and when weighing the granular material while the same is being conveyed. In this granular material supply system, the granular material delivered through the inlet onto the belt conveyor is conveyed, and the outlet is formed below a delivery end of the belt conveyor.

In the granular material supply system according to the first aspect of the present invention, the pressure case may be a pressure vessel including a cylindrical body and a pair of end plates closing the opposite ends of the cylindrical body, and capable of withstanding positive or negative pressure. The pressure case, i.e., the pressure vessel, is excellent in airtightness and pressure tightness, is resistant to breakage, has structural advantages and can be formed in a small size.

According to the first aspect of the present invention, a weighing means may be disposed in the pressure case to weigh the granular material being conveyed by the conveying means. The weighing means may be, for example, a load cell. When the conveying means includes the belt conveyor, one or some of carrier rollers included in the belt conveyor are supported on load cells to weigh the granular material while the same is being conveyed. Since the weighing means measure the weight of the granular material together with that of only relatively light components of the belt conveyor, the granular material can be weighed in a greatly improved weighing accuracy.

In the granular material supply system according to the first aspect of the present invention, the conveying means may include a belt conveyor having a plurality of carrier rollers and a conveyor belt supported on the carrier rollers, the granular material supplied onto the belt conveyor through the inlet may be conveyed by the belt conveyor, and the weighing means may weigh the granular material on a part of the conveyor belt between the two adjacent carrier rollers disposed at positions other than those directly below the inlet. The part of the conveyor belt between the two adjacent carrier rollers can be regarded as a rigid part independent of a part of the same directly below the inlet. Thus a fixed amount of the granular material on the part of the conveyor belt between the two adjacent carrier rollers can be weighed by the weighing means without weighing the granular material being supplied through the inlet onto the part of the conveyor belt directly below the inlet. The total weight of the granular material conveyed by the belt conveyor can be easily determined on the basis of a value measured by the weighing means and time for which the granular material is conveyed.

The granular material supply system according to the first aspect of the present invention may be provided with a gas blowing means for blowing an inert gas into the pressure case to carry the granular material fallen off the conveying means in the pressure case or to purge the pressure case of gases. The gas blown into the pressure case carries the granular material fallen off the conveying means in the pressure case toward the outlet to prevent the accumulation of the granular material fallen off the conveying means. The gas blown into the pressure case purges the pressure case of gases.

In the granular material supply system according to the first aspect of the present invention, the granular material supply unit includes one granular material supply hopper, a granular material supply line provided with a stop valve means may be connected to a lower part of the granular material supply hopper. The granular material contained in the granular material supply hopper is supplied through the granular material supply line and the inlet into the pressure case when the stop valve means is opened. The supply of the granular material from the granular material supply hopper into the pressure case is stopped when the stop valve means is closed. In a state where the stop valve is closed, gases contained in the granular material supply hopper is replaced with an inert gas to permit an external loading means to load the granular material supply hopper with the granular material.

In the granular material supply system according to the first aspect of the present invention, the granular material supply unit may include a plurality of granular material supply hoppers, the pressure case may be provided with a plurality of inlets connected to the plurality of granular material supply hoppers, respectively, and granular material supply lines each provided with a stop valve means may be connected to lower parts of the granular material supply hoppers, respectively. The granular material contained in each granular material supply hopper is supplied through the associated granular material supply line and the associated inlet into the pressure case when the associated stop valve means is opened. The supply of the granular material from each granular material supply hopper into the pressure case is stopped when the associated stop valve means is closed. In a state where the stop valve is closed, gases contained in each granular material supply hopper is replaced with an inert gas to permit an external loading means to load the granular material supply hopper with the granular material.

The plurality of granular material supply hoppers may contain granular materials of different kinds, respectively. All or some of the granular materials of different kinds are supplied into the pressure case, and the conveying means conveys the same toward the outlet to feed the same into the granular material using apparatus.

In the granular material supply system according to the first aspect of the present invention, a feed line connected to the outlet of the pressure case may be provided with a stop valve means. The granular material can be fed through the outlet into the granular material using apparatus when the stop valve means is opened. The granular material supply system can be disconnected from the granular material using apparatus by closing the stop valve means. In a state where the stop valve means of the feed line is closed, the gases contained in the granular material supply hopper can be replaced with an inert gas to permit an external loading means to load the granular material supply hopper with the granular material.

In the granular material supply system according to the first aspect of the present invention, the granular material supply hopper may be provided with a gas discharging means for discharging gases from the granular material supply hopper, and a purging gas blowing means for blowing a purging gas into the granular material supply hopper. In a state where the flow of the granular material through inlet or the outlet of the pressure case is prevented by the stop valve means, the gases contained in the granular material supply hopper can be replaced with an inert gas by blowing the purging gas into the granular material supply hopper by the purging gas blowing means and discharging the gases from the granular material supply hopper by the gas discharging means, and the granular material supply hopper can be charged with the granular material.

According to a second aspect of the present invention, a granular material supply system for a closed system, for supplying granular materials to a granular material using apparatus included in the closed system without opening the closed system to the external environment comprises a plurality of granular material supply units for holding and supplying granular materials of a plurality of kinds, a common pressure case provided with a plurality of inlets connected to the plurality of granular material supply units, respectively, and at least one outlet through which the granular materials are fed, and a common conveying means disposed in the common pressure case to convey the granular materials delivered thereto through the plurality of inlets to the outlet, wherein each of the granular material supply units includes a hopper for holding the granular material, a pressure case provided with an inlet connected to a granular material supply line connected to the hopper, and an outlet connected to the inlet of the common pressure case, and a conveying means disposed in the pressure case to convey the granular material delivered thereto to the outlet.

Basically, the plurality of hoppers of the plurality of granular material supply units contain granular materials of different kinds, respectively. In each granular material supply unit, the conveying means disposed in the pressure case is operated to receive the granular material through the inlet into the pressure case. Granular material supply rate can be adjusted by adjusting the conveying speed of the conveying means, and the feed of the granular material can be stopped by stopping the conveying means. Accordingly, all or some of the granular materials of the plurality of kinds can be delivered to the common conveying means disposed in the common pressure case at desired supply rates, respectively, the granular materials can be conveyed to the outlet by the common conveying means and can be fed to the granular material using apparatus. The granular material supply system is capable of supplying the granular materials to the granular material using apparatus without opening the closed system to the external environment. Therefore, the granular material supply system is applicable to various plants including smelting reduction steelmaking plants, direct reduction steelmaking plants, coal gasification plants and vacuum degassing plants.

In this granular material supply system, the pressure case of each granular material supply unit may be immovable, any special joints, such as expansion joints, are not necessary for connecting the inlet and the outlet of the pressure case to the hopper and inlet of the common pressure case, the common pressure case may be immovable, and any special joints, such as expansion joints are not necessary for connecting the outlet of the common pressure case to the granular material using apparatus.

Thus, the granular material supply system is very simple in construction, and the pressure cases and the common pressure case are not very tall. Therefore the granular material supply system has a relatively small height, which is advantageous in respect of space for installation. Leakage of gasses through the joints can be surely prevented. Since the granular material is conveyed by the conveying means in each pressure case and the granular materials are conveyed by the common conveying means in the common pressure case, noise and vibration generated by the conveying means can be greatly reduced.

Each granular material supply unit may be provided with a weighing means for weighing the granular material being conveyed by the conveying means in the pressure case, each inlet or outlet may be provided with a stop valve means, the outlet of the common pressure case may be provided with a stop valve means. The common pressure case may be provided with outlets in opposite end parts thereof, respectively, and the common conveying means may be capable of conveying the granular materials selectively in the normal or the reverse direction.

In the granular material supply system according to the second aspect of the present invention, the common conveying means and the conveying means may be belt conveyors. The belt conveyors can be formed in simple, small construction, which facilitates the installation of the belt conveyors in the common pressure case and the pressure cases and weighing the granular materials in the pressure cases or in the common pressure case.

In the granular material supply system according to the second aspect of the present invention, the common pressure case may be a pressure vessel having a cylindrical body and a pair of end plates closing the opposite ends of the cylindrical body. The pressure case, i.e., the pressure vessel, is excellent in airtightness and pressure tightness, is resistant to breakage, has structural advantages and can be formed in a small size.

In the granular material supply system according to the second aspect of the present invention, each of the pressure case may be a pressure vessel having a cylindrical body and a pair of end plates closing the opposite ends of the cylindrical body. The pressure case, i.e., the pressure vessel, is excellent in airtightness and pressure tightness, is resistant to breakage, has structural advantages and can be formed in a small size.

According to the second aspect of the present invention, a weighing means may be installed in each of the pressure cases to weigh the granular material being conveyed by the conveying means. The weighing means may be, for example, a load cell. When the conveying means includes the belt conveyor, one or some of carrier rollers included in the belt conveyor are supported on load cells to weigh the granular material while the same is being conveyed. Since the weighing means measure the weight of the granular material together with that of only relatively light components of the belt conveyor and is capable of weighing the granular material without being affected by the pressure of a gas, the granular material can be weighed in a greatly improved weighing accuracy.

In the granular material supply system according to the second aspect of the present invention, the common pressure case may be provided with outlets in opposite end parts thereof and the common conveying means may be capable of conveying the granular materials selectively in the normal or reverse direction. The common conveying means is operated to convey the granular materials in the normal direction to one of the outlets and the same is operated to convey the granular materials in the reverse direction to the other outlet. Thus, the granular materials can be supplied selectively to one or the other of two granular material using apparatuses.

The granular material supply system according to the second aspect of the present invention may be provided with a filtering means capable of sucking and collecting fine particles produced in the common pressure case. Fine particles are produced in the vicinity of the outlet of the common pressure case when the granular materials are dropped from the common conveying means. The fine particles deposit gradually in the bottom of the common pressure case unless the common pressure case is cleaned periodically. Since the filtering means capable of sucking and collecting fine particles is combined with the common pressure case, fine particles deposit scarcely in the common pressure case. A gas or air sucked together with fine particles and cleaned by the filtering means may be returned into the common pressure case. The granular material supply system may share the filtering means with other granular material supply systems.

BEST MODE FOR CARRYING OUT THE INVENTION

Preferred embodiments of the present invention will be described with reference to the accompanying drawings.

A granular material supply system 1 in a preferred embodiment according to the present invention for a closed system will be described as applied to a smelting reduction steelmaking plant for supplying a granular material, such as iron ore pellets or cokes, into a reaction furnace, i.e., a granular material using apparatus without opening the closed system into the external environment.

Figure 1:
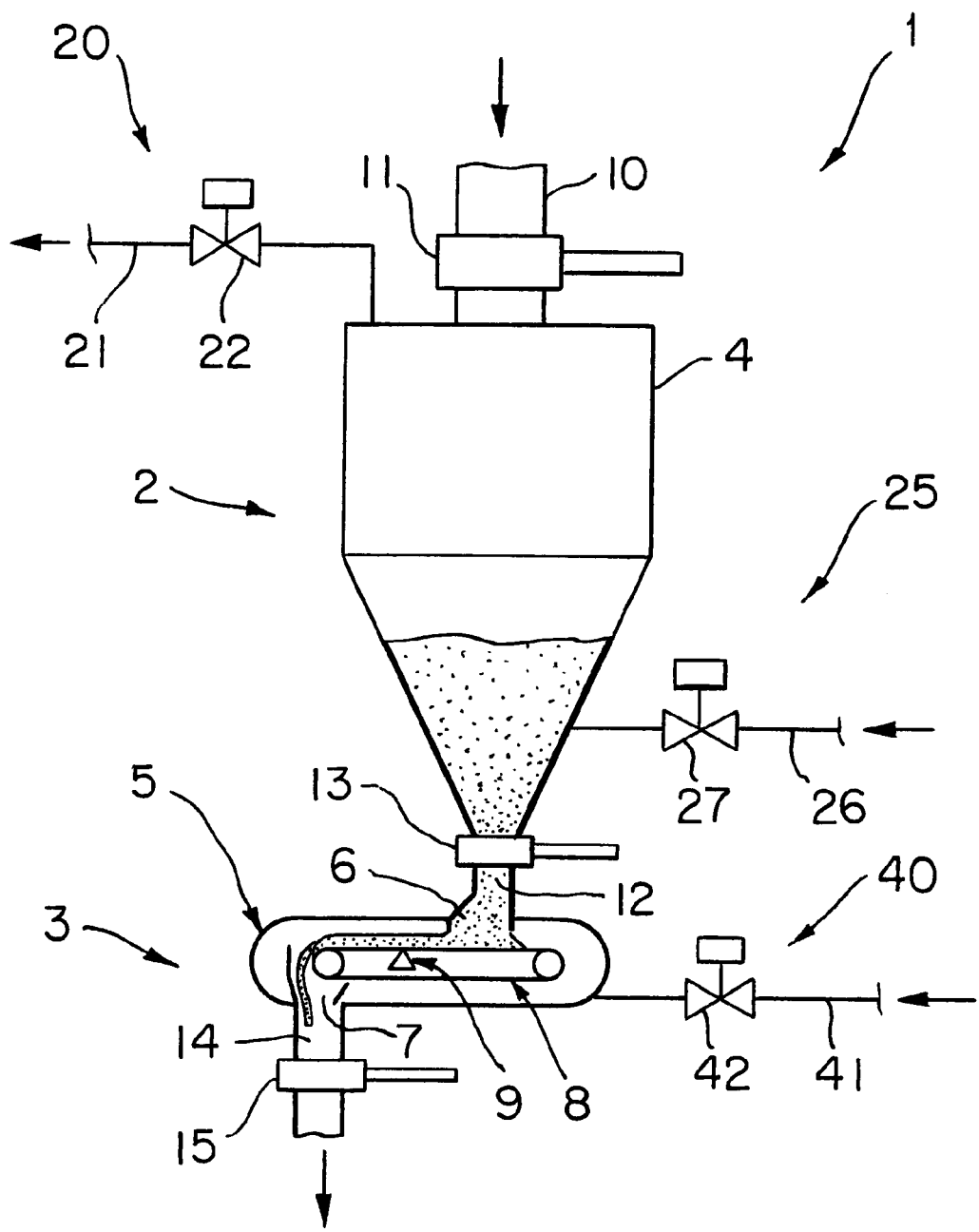
FIG. 1 is schematic sectional view of a granular material supply system in a preferred embodiment according to the present invention.
Figure 2:
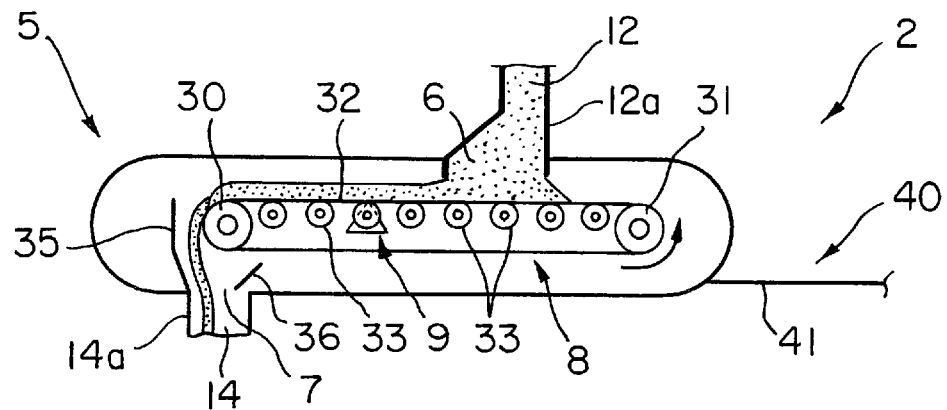
FIG. 2 is an enlarged sectional view of an essential part of the granular material supply system shown in FIG. 1.

Referring to FIGS. 1 and 2, the granular material supply system 1 includes a granular material supply unit 2 for holding and supplying a granular material supplied thereto by an external granular material loading system, and a granular material feed unit 3 that receives the granular material from the granular material supply unit 2 and feeds the same. The granular material supply unit 2 has a granular material supply hopper (hereinafter referred to simply as "hopper") 4. The granular material feed unit 3 has a pressure case 5 and a belt conveyor 8, i.e., a conveying means, disposed in the pressure case 5. The pressure case 5 is a pressure vessel formed by attaching a pair of end plates to the opposite ends of a cylindrical body and capable of withstanding positive or negative pressure. An inlet 6 is formed in an upper right-hand part of the pressure case 5 and is connected to the hopper 4. An outlet 7 is formed in a lower left-hand part of the pressure case 5. The granular material is fed through the outlet 7. The belt conveyor 8 conveys the granular material supplied through the inlet 6 into the pressure case 5 to the outlet 7. A weighing device 9 is disposed in the pressure case 5 to weigh the granular material being conveyed by the belt conveyor 8.

A granular material loading line 10 provided with a stop valve 11 has one end connected to an upper part of the hopper 4 and the other end connected to a granular material loading system, not shown. A granular material supply line 12 provided with a stop valve 13 has one end connected to a lower part of the hopper 4 and the other end connected to the inlet 6 of the pressure case 5. A granular material feed line 14 provided with a stop valve 15 has one end connected to the outlet 7 of the pressure case 5 and the other end connected to the reaction furnace, not shown. The stop valves 11, 13 and 15 are remote-controlled valves capable of remotely controlled for opening and closing to control the flow of the granular material through the granular material loading line 10, the granular material supply line 12 and the granular material feed line 14, respectively. The stop valves 11, 13 and 15 may be manually operated valves.

The hopper 4 is provided with a gas discharging system 20 for discharging gases, such as carbon monoxide gas and sulfurous acid gas, from the hopper 4 and a purging system 25 for blowing a purging inert gas into the hopper 4. The gas discharging system 20 has a discharge line 21 connected to an upper part of the hopper 4 and a remote-controlled shutoff valve 22 placed in the discharge line 21. The purging system 25 has a gas supply line 26 having one end connected to a nitrogen gas source and the other end connected to a lower part of the hopper 4, and a remote-controlled shutoff valve 27 placed in the gas supply line 26. The purging gas is an inert gas, such as nitrogen gas or a carbon dioxide gas. Air or a process gas (pressurized process gas when necessary) may be used as a purging gas.

Referring to FIG. 2, the belt conveyor 8 consists essentially of a pair of pulleys 30 and 31 disposed with their axes extended in parallel to a direction perpendicular to the paper, a belt 32 of a predetermined width extended between the pulleys 30 and 31, a plurality of carrier rollers 33 disposed with their axes extended in parallel to a direction perpendicular to the paper so as to support the upper side of the belt 32 on the level of a plane including the upper ends of the pulleys 30 and 31, and a motor, not shown, for driving the pulley 30 (or the pulley 31).

The pulley 30 is disposed above the outlet 7 and the pulley 31 is disposed below the inlet 6. The belt 32 is turned in the direction of the arrow to convey the granular material delivered through the inlet 6 onto the belt 32 toward the outlet 7. The motor for driving the belt conveyor 8 may be disposed either inside or outside the pressure case 5. At least one of the end plates of the pressure case 5 is fastened to the cylindrical body with bolts so as to be separated from the cylindrical body to open the pressure case 5 for work for installing the belt conveyor 8 and the weighing device 9 in the pressure case 5 and for maintenance work.

A part adjacent to the inlet of a supply duct 12a defining the granular material supply line 12 is expanded in a granular material conveying direction, i.e., to the left as viewed in FIG. 2. The supply duct 12 is extended into the pressure case 5 so that the lower end of the supply duct 12a is located near the upper surface of the belt 32. A feed duct 14a defining the feed line 14 is connected to the outlet 7. A substantially upright guide plate 35 is connected to the left side wall, as viewed in FIG. 2, of the feed duct 14a in the pressure case 5, and an inclined guide plate 36 is disposed above the right side wall, as viewed in FIG. 2, of the feed duct 14a in the pressure case 5 to guide the granular material fallen off the belt conveyor 8 toward the outlet 7.

The weighing device 9 includes a load cell and supports the carrier roller 33 indicated by a chain line in FIG. 2. Granular material feed rate (kg/min) is estimated from a value measured by the load cell.

The weighing device 9 measures the weight of the granular material on a part of the belt 32 of the belt conveyor 8 supported by the two adjacent carrier rollers 33 (or the one carrier roller 33). The part of the belt 32 of the belt conveyor 8 carrying the granular material to be weighed is spaced apart from a part of the belt 32 below the inlet 6. The part of the belt 32 supported on the two adjacent carrier rollers 33 and carrying the granular material to be weighed is a rigid part independent of a part of the same directly below the inlet 6. Thus the weighing device 9 can weigh a fixed amount of the granular material on the part of the belt 32 between the two adjacent carrier rollers 33 without being affected by the weight of the granular material being supplied through the inlet 6 onto the part of the belt 32 directly below the inlet 6. The total weight of the granular material conveyed by the belt conveyor 8 can be determined on the basis of a value measured by the weighing device 9 and time for which the granular material is conveyed.

The correlation between the type of the granular material, the conveying speed of the belt conveyor 8, the granular material feed rate and values measured by the load cell is empirically or theoretically determined beforehand, and the granular material feed rate is determined on the basis of a value measured by the load cell and the correlation. The granular material feed rate can be adjusted by adjusting the conveying speed of the belt conveyor 8 and the feed of the granular material can be stopped by stopping the belt conveyor 8.

A gas blowing system 40 is connected to the pressure case 5 to blow an inert gas into the pressure case 5 for moving the granular material fallen of f the belt conveyor 8 in the pressure case 5 toward the outlet or for purging the pressure case 5 of gases. The gas blowing system 40 consists essentially of a gas supply line 41 having one end connected to an inert gas source, not shown, and the other end connected to a lower right-hand part of the pressure case 5 and a remote-controlled shutoff valve 42 placed in the gas supply line 41. The inert gas to be blow into the pressure case by the gas blowing system 40 is nitrogen gas or carbon dioxide gas. Air or a process gas (pressurized process gas when necessary) may be used instead of the inert gas.

The operation and effect of the granular material supply system 1 will be explained.

In an initial state, the stop valves 11, 13 and 15 of the granular material loading line 10, the granular material supply line 12 and the granular material feed line 15 are closed. When supplying the granular material into reaction furnace, the stop valves 13 and 15 are opened to open the granular material supply line 12 and the granular material feed line 14 and the belt conveyor 8 is actuated. The stop valve 11 of the granular material loading line 10 is kept closed to keep the hopper 4, the granular material supply line 12, the pressure case 5, the granular material feed line 14 and the reaction furnace isolated from the external environment. An inert gas may be supplied at a proper flow rate through the gas supply line 26 into the hopper 4 while the granular material is supplied because a negative pressure produced in the hopper 4 will obstruct the supply of the granular material.

The granular material contained in the hopper 4 is delivered through the granular material supply line 12 and the inlet 6 onto the belt conveyor 8. The belt conveyor 8 conveys the granular material toward the outlet 7 and feeds the same through the outlet 7 and the granular material feed line 14 into the reaction furnace. The weighing device 9 weighs the granular material being conveyed by the belt conveyor 8. Some of the granular material falls off the belt conveyor 8 onto the bottom of the pressure case 5. The gas blowing system 40 blows nitrogen gas into the pressure case 5 to move the granular material scattered on the bottom of the pressure case 5 toward the outlet 7 so that the granular material falls into the reaction furnace.

As mentioned above, the granular material feed rate can be adjusted by adjusting the conveying speed of the belt conveyor 8. When stopping feeding the granular material, the belt conveyor 8 is stopped and the stop valve 15 is closed to prevent the flow of the granular material through the granular material feed line 14. When the belt conveyor 8 is stopped, the granular material is not conveyed any more to the outlet 7, and the pressure case 5 is disconnected from the reaction furnace by closing the granular material feed line 14 by the stop valve 15. The belt 32 of the belt conveyor 8 may be reversed for movement by a predetermined short distance after stopping the belt conveyor 8. The flow of the granular material through the granular material supply line 12 may be prevented by closing the stop valve 13 to stop delivering the granular material onto the belt conveyor 8.

When loading the granular material into the hopper 4, the feed of the granular material into the reaction furnace is stopped, the stop valve 13 is closed to prevent the flow of the granular material through the granular material supply line 12, the shutoff valves 22 and 27 of the gas discharging system 20 and the purging system 25 are opened, the purging inert gas is blown into the hopper 4 and gases are discharged from the hopper 4 to replace the gases with the inert gas. Subsequently, the shutoff valves 22 and 27 are closed, the stop valve 11 is opened to permit the flow of the granular material through the granular material loading line 10. Thus, the granular material contained in a granular material loading unit, not shown, is loaded through the granular material loading line 10 into the hopper 4.

Since the weighing device 9 disposed in the pressure case 5 weighs the granular material, the weight of the hopper 4 does not need to be weighed together with the weight of the granular material. Thus, the hopper 4 and the pressure case 5 may be immovable and the supply duct 12a defining the granular material supply line 12 can be directly and rigidly connected to the inlet 6 of the pressure case 5. Therefore, the closed granular material supply system 1 can be formed without providing the granular material loading line 10, the granular material supply line 12 and the granular material feed line 14 with any special joint, such as expansion joints. Consequently, the granular material supply system 1 is very simple and small in construction, does not need a large space for installation and does not require a large equipment investment, and the leakage of gases from the granular material loading line 10, the granular material supply line 12 and the granular material feed line 14 can be surely prevented. The pressure case 5, i.e., a pressure vessel, is excellent in airtightness and pressure tightness, is resistant to breakage, has structural advantages and can be formed in a small size.

Since the weighing device 9 for measuring the granular material being conveyed by the belt conveyor 8 is disposed in the pressure case 5, the weighing device 9 is simple in construction. Since the weighing device 9 measures the weight of the granular material together with that of only a part of the belt conveyor 8, the granular material can be weighed in a greatly improved weighing accuracy. Since the belt conveyor 8 does not vibrate greatly, vibrations do not reduce weighing accuracy. Since the gas blowing system 40 is combined with the pressure case 5, the granular material fallen off the belt conveyor 8 in the pressure case 5 can be moved toward the outlet 7 to prevent the accumulation of the granular material under the belt conveyor 8.

Since the granular material supply system 1 is provided with the stop valve 11 for controlling the flow of the granular material through the granular material loading line 10, the stop valve 13 for controlling the flow of the granular material through the granular material supply line 12, the gas discharging system 20 for discharging gases from the hopper 4 and the purging system 25 for blowing a purging inert gas into the hopper 4, the granular material can be loaded into the hopper 4 after closing the stop valve 13 of the granular material supply line 12 and replacing the gases contained in the hopper with the inert gas, and the gases contained in the hopper 4 can be efficiently replaced with the inert gas.

Granular material supply systems in modifications of the granular material supply system 1 will be described with reference to FIGS. 3 to 7, in which parts like or corresponding to those of the granular material supply system 1 in the preferred embodiment are denoted by the same reference characters and the description thereof will be omitted.

Figure 3:
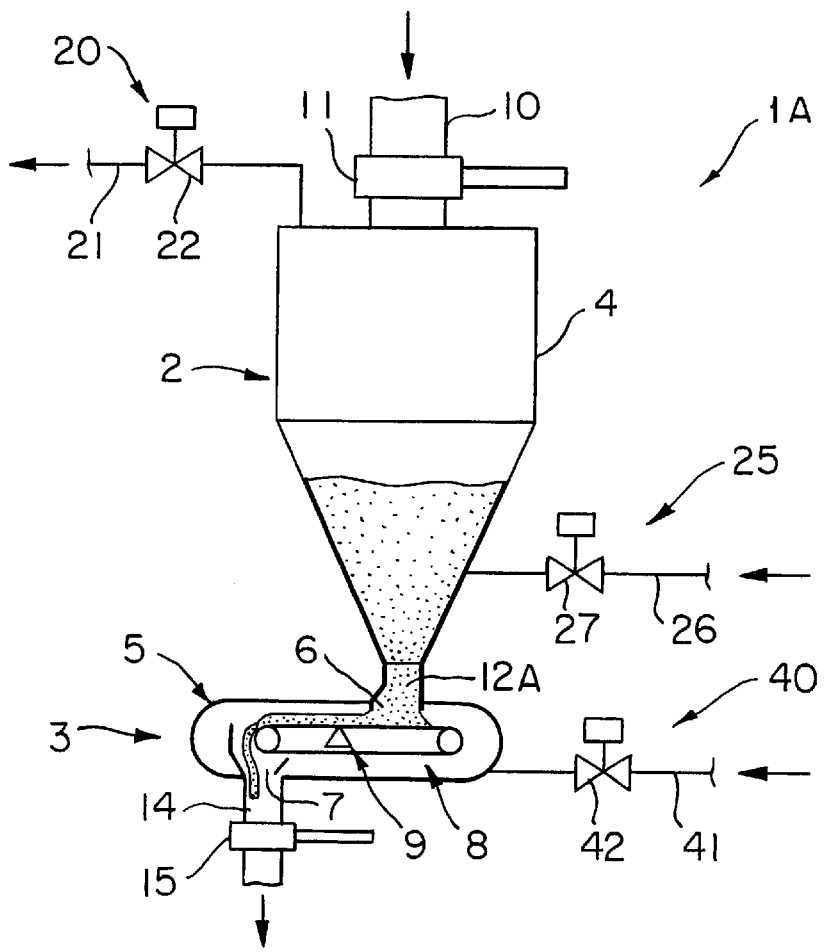
FIG. 3 is a schematic sectional view of a granular material supply system in a first modification of the granular material supply system shown in FIG. 1.

(1) First Modification (FIG. 3)

A granular material supply system 1A in a first modification is not provided with any device corresponding to the stop valve 13 of the granular material supply system 1. In the granular material supply system 1A, a granular material delivered from a hopper 4 through a granular material supply line 12A into a pressure case 5 is carried by a conveyor 8 toward an outlet 7 and is fed through the outlet 7 and a granular material feed line 14 into a reaction furnace when a stop valve 15 placed in the granular material feed line 14 is opened and the belt conveyor 8 is operated. The pressure case 5 can be disconnected from the reaction furnace by stopping the belt conveyor 8 and closing the stop valve 15 placed in the granular material feed line 14.

The granular material discharged from a granular material loading unit, not shown, is loaded through a granular material loading line 10 into the hopper 4 when a stop valve 11 placed in the granular material loading line 11 is opened after closing the stop valve 15 to stop feeding the granular material, opening shutoff valves 22 and 27 included in a gas discharging system and a purging system 25, replacing gases contained in the hopper 4 with an inert gas, and closing the shutoff valves 22 and 27. The granular material supply system 1A is the same in operation and effect as the granular material supply system 1.

Figure 4:
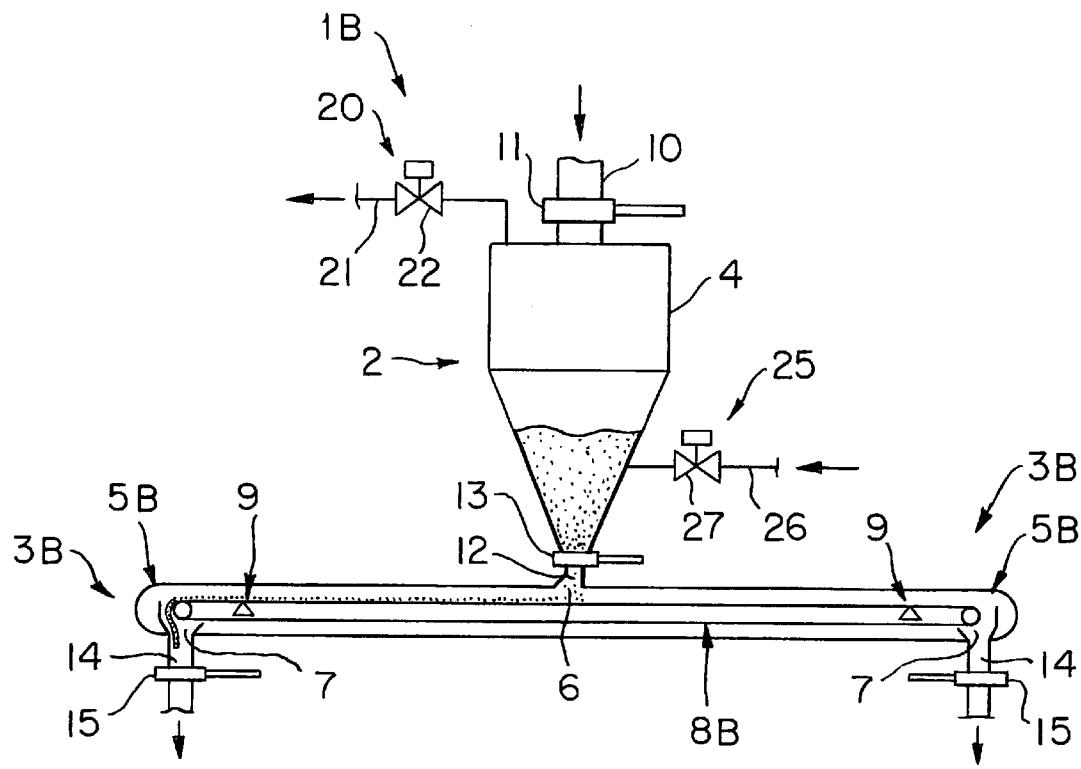
FIG. 4 is a schematic sectional view of a granular material supply system in a second modification of the granular material supply system shown in FIG. 1.

(2) Second Modification (FIG. 4)

A granular material supply system 1B in a second modification has a granular material feed unit 3B formed by modifying the granular material feed unit 3 of the granular material supply system 1. The granular material feed unit 3B has a long pressure case 5B and a long belt conveyor 8B disposed in the pressure case 5B. An inlet 6 is formed in a middle part of the upper wall of the pressure case 5B and is connected to a hopper 4 by a granular material supply line 12. Outlets 7 are formed in opposite end parts of the lower wall of the pressure case 5B, respectively. The belt of the belt conveyor 8B can be turned selectively in the normal or the reverse direction. The outlets 7 are connected to reaction furnaces by granular material feed lines 14, respectively.

The granular material supply system 1B is capable of supplying the granular material to two reaction furnaces. Thus the granular material supply system 1B is advantageous in equipment investment and space for installation. The granular material supply system 1B is the same in operation and effect as the granular material supply system 1.

Figure 5:
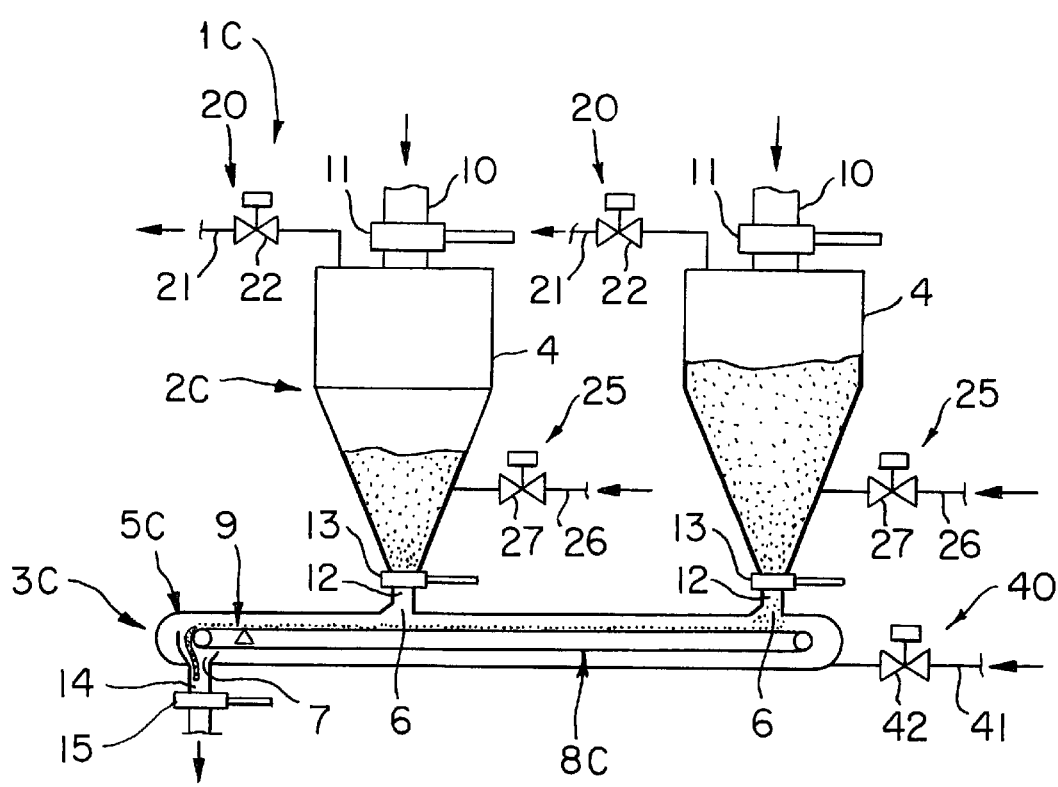
FIG. 5 is a schematic sectional view of a granular material supply system in a third modification of the granular material supply system shown in FIG. 1.

(3) Third Modification (FIG. 5)

A granular material supply system 1C in a third modification has a granular material supply unit 2C including two hoppers 4 for holding granular materials of different kinds, such as iron or pellet and cokes, respectively. A granular material feed unit 3C has a long pressure case 5C provided with two inlets connected to the two hoppers 4, respectively. The granular material supply system 1C is capable of supplying the granular materials of different kinds to a reaction furnace maintaining the airtightness thereof.

Each of the hoppers 4 is similar in construction to that of the granular material supply system 1. Stop valves 11 and 13 are placed in a granular material loading line 10 and a granular material supply line 12, respectively. Gas discharging system s 20 for discharging gases from the hoppers 4 and purging systems 25 for blowing an inert gas into the hoppers 4 are connected to the hoppers 4, respectively. Disposed in the pressure case 5C, i.e., a pressure vessel, are a belt conveyor 8C and a weighing device 9 for weighing the granular materials being conveyed toward an outlet 7 by the belt conveyor 8C. The weighing device 9 weighs the granular materials delivered to the pressure case 5C while the same is being conveyed toward the outlet 7 by the belt conveyor 8C. The granular materials are fed through the outlet and a granular material feed line 14 provided with a stop valve 15 into a reaction furnace.

The granular material supply system 1C can hold the granular materials of different kinds in the two uppers 4. The desired one of the two kinds of granular materials held in the two hoppers 4 can be delivered into the pressure case 5C and can be conveyed to the outlet 7 by the belt conveyor 8C to feed the same into the reaction furnace. The granular material supply system 1C is the same in operation and effect as the granular material supply system 1. The stop valves 13 associated with the two hoppers 4 may be capable of regulating the flow of the granular materials to supply the granular materials of different kinds from the hoppers 2 at different supply rates, respectively. An additional weighing device may be combined with the belt conveyor 8C to weigh the granular material delivered from the right-hand hopper 4, as viewed in FIG. 5. The granular material supply unit 2 may be provided with three or more hoppers.

Figure 6:
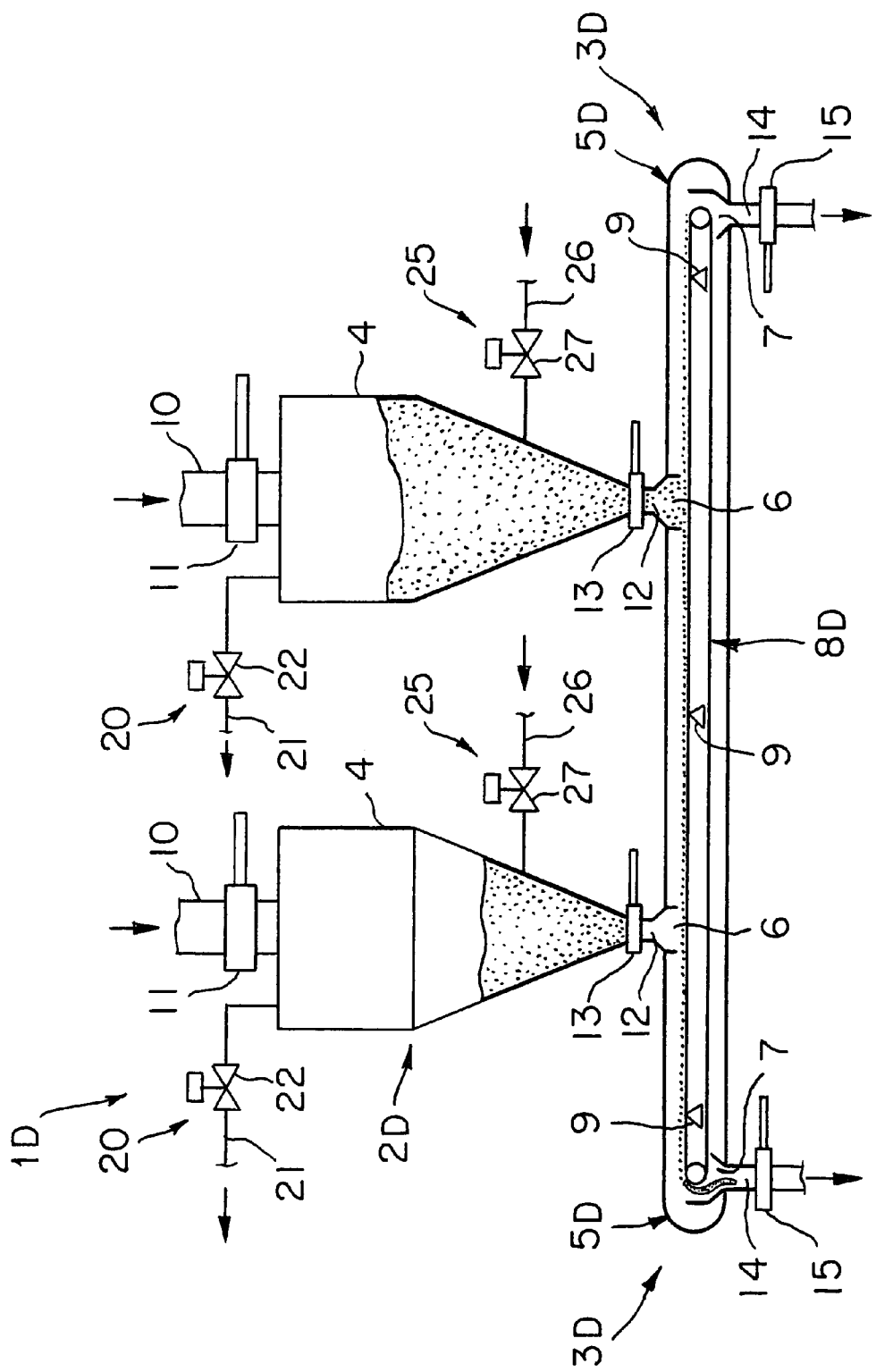
FIG. 6 is a schematic sectional view of a granular material supply system in a fourth modification of the granular material supply system shown in FIG. 1.

(4) Fourth Modification (FIG. 6)

A granular material supply system 1D in a fourth modification has a granular material feed unit 3D formed by modifying the granular material feed unit 3C of the granular material supply system 1C shown in FIG. 5. A granular material supply unit 2D, similarly to the granular material supply unit 2C, includes two hoppers 4, the granular material feed unit 3D has a long pressure case 5D, having a section extending on the right side of the right hopper 4 as viewed in FIG. 6. Outlets 7 are formed in opposite end parts of the lower wall of the pressure case 5D, respectively. The belt of a belt conveyor 8D can be turned selectively in the normal or the reverse direction. Three weighing devices 9 are placed in the pressure case 5D. This granular material supply system 1D is capable of holding granular materials of two kinds in the two hoppers 4 and of supplying the granular materials of two kinds to two reaction furnaces.

Desirably, a gas blowing system is connected to a middle part of the lower wall of the pressure case 5D and a gas is blown into the pressure case 5D so as to move the granular materials fallen off the belt conveyor 8D toward the outlets 7 formed in opposite end parts of the lower wall of the pressure case 5D.

Figure 7:
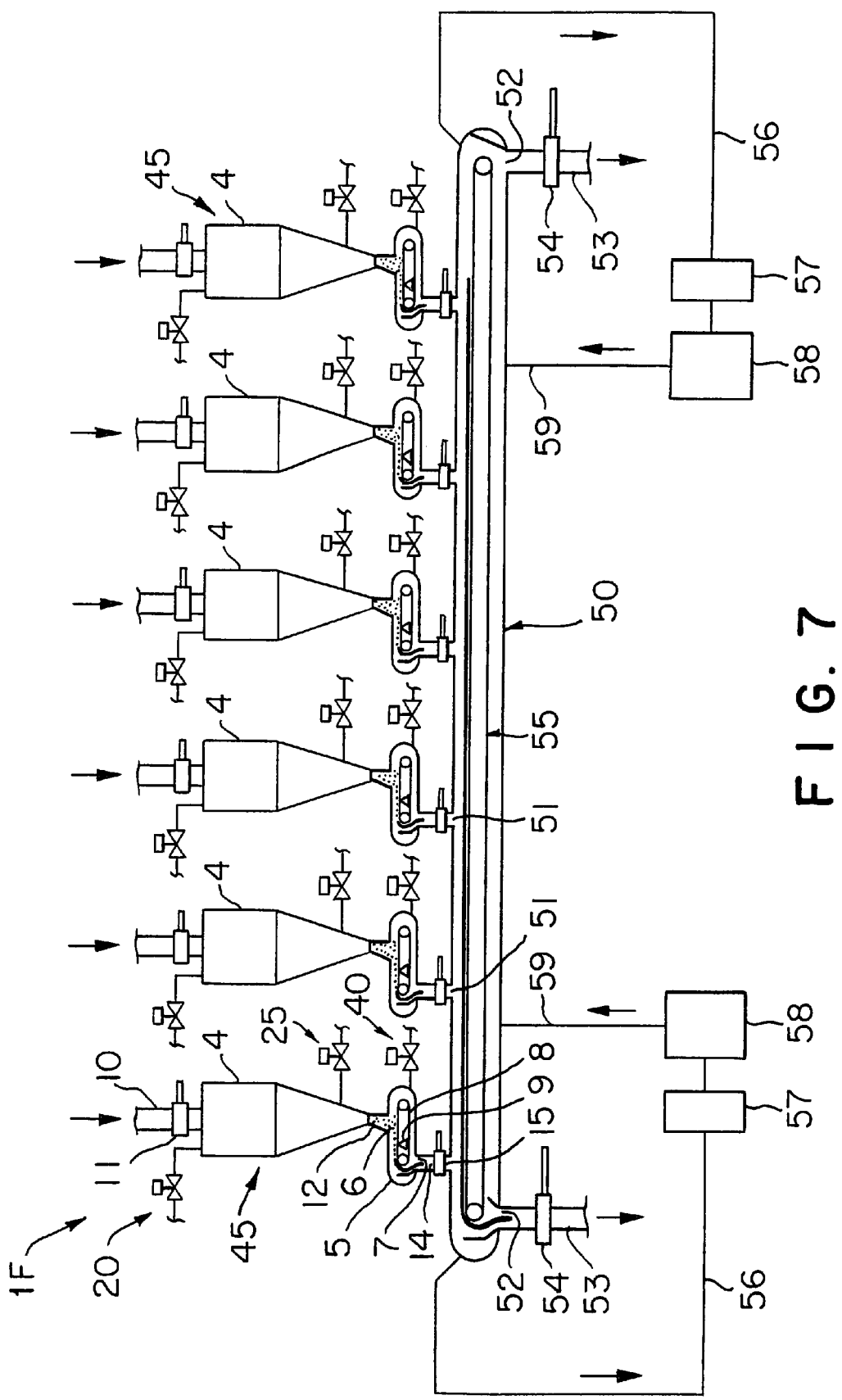
FIG. 7 is a schematic sectional view of a granular material supply system in a fifth modification of the granular material supply system shown in FIG. 1.
Figure 8:
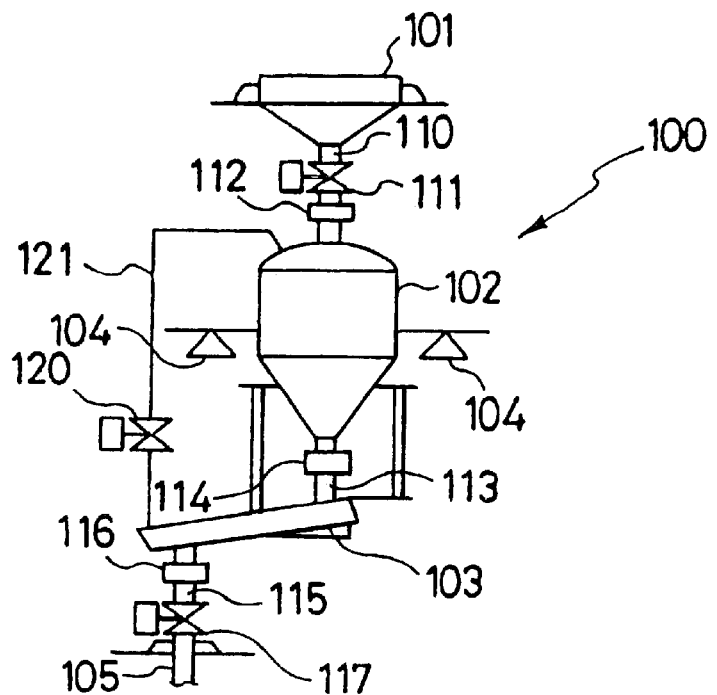
FIG. 8 is a schematic sectional view of a prior art granular material supply system.
Figure 9:
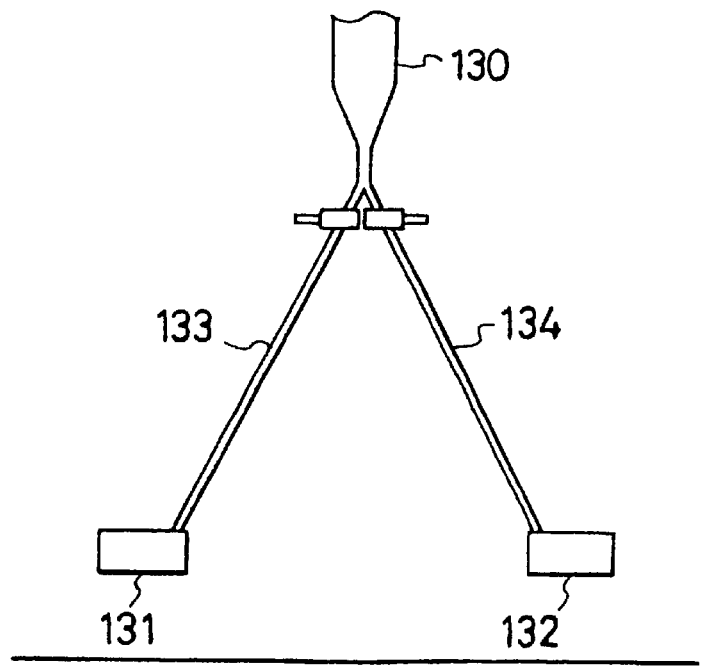
FIG. 9 is a schematic sectional view of another prior art granular material supply system.

(5) Fifth Modification (FIG. 7)

A granular material supply system 1F in a fifth modification has six granular material supply units 45. The six granular material supply units 45 supply granular materials to a common pressure case 50 provided with a common belt conveyor 55 therein. Each granular material supply unit 45 is the same in construction as the granular material supply unit 2A of the granular material supply system 1A and hence parts thereof like or corresponding to those of the granular material supply unit 2A of the granular material supply system 1A are denoted by the same reference characters and the same will be briefly described.

Each granular material supply unit 2A of the granular material supply system 1A supply unit 45 has a hopper 4, a pressure case 5 provided with an inlet 6 and an outlet 7, a belt conveyor 8 (conveying means) disposed in the pressure case 5, and a weighing device 9 for weighing a granular material being conveyed by the belt conveyor 8. A granular material loading line 10 is provided with a stop valve 11. A granular material supply line 12 is not provided with any stop valve.

A gas discharging system 20 for discharging gases from the hopper 4 and a purging system 25 for blowing an inert gas into the hopper 4 are connected to each hopper 4. A gas blowing system 40 is connected to the pressure case 5 to blow an inert gas into the pressure case 5 for moving the granular material fallen off the belt conveyor 8 in the pressure case 5 toward the outlet 7 or for purging the pressure case 5 of gases.

The common pressure case 50 is disposed below the six granular material supply units 45. The common belt conveyor 55 (common conveying means) is disposed in the pressure case 50. The common pressure case 50 is a pressure vessel formed by attaching a pair of end plates to the opposite ends of a cylindrical body and capable of withstanding positive or negative pressure.

Six inlets 51 are formed in the upper wall of the common pressure case 50. The six inlets 51 are connected to the six outlets 7 of the six granular material supply units 45 by granular material supply lines 14 each provided with a stop valve 15. Two outlets 52 are formed in opposite end parts of the lower wall of the common pressure case 50, respectively. The outlets 52 are connected to reaction furnaces by granular material feed lines 53 provided with stop valves 54, respectively. The belt of the common belt conveyor 55 can be turned selectively in the normal or the reverse direction. The six granular material supply units 45 and the common pressure case 50 are combined to form a closed system.

Fine particles are produced in the vicinity of the opposite end parts of the common conveyor 55 when the granular materials drop from the common conveyor 55. If the fine particles are not removed, the fine particles deposit on the bottom of the common pressure case 50 and hence the common pressure case 50 must be cleaned periodically. Cleaning systems are connected to opposite end parts of the common pressure case 50. Each of the cleaning systems includes a suction pipe 56 connected to the end part of the common pressure case 50, a motor-driven fan 57 having a suction port connected to the suction pipe 56, a bag filter 58 connected to a discharge port of the motor-driven fan 57, and a return pipe 59 having one end connected to the bag filter 58 and the other end connected to the common pressure case 50. Each cleaning system sucks particle-laden gases from the common pressure case 50, filters out fine particles from the particle-laden gases by the bag filter 58 and returns the filtered gases through the return pipe 59 into the common pressure case 50. The bag filter 58 corresponds to the filtering means.

In this granular material supply system 1F, the six hoppers 4 may contain and supply granular materials of the same kind or different kinds. For example, the two left-hand hoppers 4 may contain and supply pulverized coal, the two middle hoppers 4 may contain iron ore pellets, and the two right-hand hoppers 4 may contain pulverized coal.

In each granular material supply unit 45, the hopper 4 supplies the granular material onto the belt conveyor 8 disposed in the pressure case 5, the weighing device measures while the granular material is being conveyed by the belt conveyor 8, and the granular material is discharged through the outlet 7 of the pressure case 5 and the inlet 51 of the common pressure case 50 into the common pressure case 50. Granular material feed rate can be adjusted by adjusting the conveying speed of the belt conveyor 8, and the feed of the granular material can be stopped by stopping the belt conveyor 8. Desirably, a gas blowing system is connected to a middle part of the lower wall of the common pressure case 50 and a gas is blown into the common pressure case 50 so as to move the granular materials fallen off the belt conveyor 55 toward the outlets 52 formed in opposite end parts of the lower wall of the common pressure case 50.

Thus one or some desired ones of the granular materials of the plurality of kinds can be supplied from the hoppers 4 through the pressure cases 5, the belt conveyors 8, the outlets 7 and the inlets 51 into the common pressure case 50, the granular materials can be conveyed to the outlet 52 by the common belt conveyor 55 and the granular materials can be fed through the granular material feed line 53 into the reaction furnace. Since the common pressure case 50 is provided with the two outlets 52 in the opposite end parts thereof, the granular materials can be fed to the two reaction furnaces. If the two reaction furnaces are spaced wide apart, a long common pressure case and a long common belt conveyor are used as the common pressure case 50 and the common belt conveyor 55.

This granular material supply system 1F, similarly to the granular material supply system 1, is simple and small in construction and advantageous in equipment investment and space for installation. The granular material supply system 1F has a high flexibility because the same is capable of weighing the granular materials of the six kinds while the same are being conveyed, of adjusting the supply rates of those granular materials, and of supplying one or some desired ones of the plurality of kinds of granular materials. Thus the granular material supply system 1F is very advantageous in space for installation and equipment investment. The number of the granular material supply units 45 is not limited to six, but may be five or less or seven or above.

The following changes and variations may be made in the granular material supply systems in the foregoing embodiment and modifications.

1) The pressure case and the common pressure case may be installed in an inclined position or a vertical position instead of in a horizontal position.

2) The conveying means incorporated into the pressure case and the common pressure case is not limited to a belt conveyor but may be a screw conveyor. If the pressure case and the common pressure case is set in an inclined or a vertical position, the conveying means may be a bucket elevator.

3) A plurality of pressure cases and common pressure cases provided with conveying means may be connected.

4) Although the granular material supply systems have been described as applied to feeding the granular materials from the pressure case or the common pressure case into the reaction furnace (granular material using apparatus), the granular material using apparatus is not limited to the reaction furnace, but may be a closed granular material storage hopper or a closed granular material conveying system including a pressure case and a conveying means incorporated into the pressure case.

5) The pressure in the closed system essentially including the granular material supply hopper and the pressure case, or the closed system essentially including the granular material supply hoppers, the pressure cases and the common pressure case may be a positive pressure in the range of 0 to 40 kg/cm²G or a negative pressure.

6) In the granular material supply system shown in FIG. 7, the dust-laden gases sucked through the suction pipes 56 may be delivered to a common dust collector installed in the steelmaking plant to collect dust by the common dust connector.

7) The granular materials are not limited to iron ore pellets and pulverized coal, but may be various granular or pulverized materials, or particles or powder of products or parts.

As apparent from the foregoing description, in the granular material supply system according to the present invention, the granular material supply unit supplies the granular material through the inlet of the pressure case of the granular material feed unit onto the conveying means, the conveying means conveys the granular material to the outlet of the pressure case, and the granular material is fed through the outlet of the pressure case to the granular material using apparatus. Thus the granular material supply unit and the pressure case of the granular material feed unit may be immovable, the closed granular material supply system can be formed without placing any special joints, such as expansion joints, in the joint of the pressure case and the granular material supply unit and the joint of the pressure case and the granular material using apparatus, and only the conveying means must be disposed in the pressure case. Therefore, the granular material supply system is very simple in construction and has a relatively small height, which is advantageous in respect of space for installation and equipment investment.

Since the granular material is conveyed by the conveying means in the pressure case, the granular material supply rate of the granular material supply system can be readily adjusted by adjusting the conveying speed of the conveying means, and noise and vibration can be greatly reduced. The weighing means for weighing the granular material while the granular material is being conveyed by the conveying means can be easily installed and is able to weigh the granular material accurately.

The conveying means including the belt conveyor is simple in construction small in size and lightweight and hence the granular material can be accurately weighed by the weighing means while the granular material is being conveyed by the conveying means.

The pressure case formed by assembling the cylindrical body and the pair of end plates is a pressure vessel that withstands a positive or negative pressure, is excellent in airtightness and pressure tightness, is resistant to breakage, has structural advantages and can be formed in a small size.

Since the weighing means for weighing the granular material being conveyed is disposed in the pressure case, the pressure case may be set immovable and the granular material can be accurately weighed.

The granular material fallen off the conveying means in the pressure case can be driven to move to the outlet by blowing a gas into the pressure case by the gas blowing means to prevent the accumulation of the granular material in the pressure case. The pressure case can be purged of gases by blowing a purging gas into the pressure case by the gas blowing means.

The granular material held in the granular material supply hopper can be supplied through the inlet into the pressure case by opening the stop valve placed in the granular material supply line connected to the bottom of the granular material supply hopper, the supply of the granular material can be stopped and the granular material supply hopper can be disconnected from the pressure case by closing the stop valve of the granular material supply line. In a state where the granular material supply hopper is disconnected from the pressure case, the gases contained in the granular material supply hopper can be replaced with an inert gas and the granular material can be loaded into the granular material supply hopper by an external granular material loading system.

Since the granular material supply unit includes the plurality of granular material supply hoppers, the pressure case is provided with the plurality of inlets connected to the plurality of granular material supply hoppers, respectively, and the granular material supply lines connected to the bottoms of the granular material supply hoppers are provided with the stop valve means, respectively, effects mentioned in the preceding paragraph can be exercised. Granular materials of a plurality of kinds can be supplied from the plurality of granular material supply hoppers to the granular material using apparatus.

Since the granular material feed line connected to the outlet of the pressure case is provided with the stop valve means, the granular material can be fed by opening the stop valve, and the granular material feed unit can be disconnected from the granular material using apparatus by closing the stop valve means. In a state where the stop valve means of the granular material feed line is closed, the gases contained in the granular material supply hopper can be replaced with an inert gas and the granular material can be loaded into the granular material supply hopper by an external granular material loading system.

Since gas discharging means for discharging gases from the granular material supply hopper and a purging means for blowing a purging gas into the granular material supply hopper are connected to the granular material supply hopper, the gases contained in the granular material supply hopper can be easily replaced with the purging gas when loading the granular material supply hopper with the granular material.

According to the present invention, all or some of the granular materials of the plurality of kinds can be supplied from the plurality of kinds. Thus one or some desired ones of the granular materials of the plurality of kinds can be delivered from the plurality of granular material supply units at adjusted supply rates onto the common conveying means of the common pressure case, can be conveyed to the outlet of the common pressure case and can be fed into the granular material using apparatus. This granular material supply system can be formed in a closed system without using any special expansion joints or the like because the granular materials are delivered from the hoppers of the granular material supply units onto the conveying means disposed in the pressure cases, and the granular materials are delivered from the plurality of pressure cases onto the common conveying means disposed in the common pressure case, and the granular materials are fed from the common pressure case to the granular material using apparatus. Thus, the granular material supply system can be properly applied to various plants.

In this granular material supply system for a closed system, the pressure case of each granular material feed unit may be immovable, the joint of the inlet of the pressure case and the hopper and the joint of the outlet of the pressure case and the inlet of the common pressure case do not need to be provided with any special joints, such as expansion joints, the common pressure case may be immovable, and the joint of the outlet of the common pressure case and the granular material using apparatus does not need to be provided with any special joint, such as an expansion joint. Thus, the granular material supply system is very simple in construction and the pressure cases and the common pressure case are not very tall. Therefore the granular material supply system has a relatively small height, which is advantageous in respect of space for installation. Leakage of gasses through the joints can be surely prevented.

Since the granular material is conveyed by the conveying means in each pressure case and the granular materials are conveyed by the common conveying means in the common pressure case, noise and vibration generated by the conveying means can be greatly reduced.

Since the common conveying means includes a belt conveyor and each conveying means includes a belt conveyor, the common conveying means and the plurality of conveying means are simple and small in construction and lightweight, can be manufactured at a low manufacturing costs and are advantageous in respect of weighing the granular material during conveyance.

Since the pressure case is a pressure vessel, the pressure case is excellent in airtightness and pressure tightness, is resistant to breakage, has structural advantages and can be formed in a small size.

Since the weighing means is disposed in each pressure case to weigh the granular material being conveyed by the conveying means disposed in the pressure case, the granular material delivered from the granular material supply unit to the pressure case can be weighed by the weighing means. Since the weighing means weighs only a relatively light part of the conveying means together with the granular material without being affected by the pressure of the gas, weighing accuracy can be greatly improved.

Since the common pressure case is provided with the outlets in the opposite end parts thereof, and the conveying means can be driven so as to convey the granular material selectively in the normal or the reverse direction, the granular material can be conveyed to one of the outlet by driving the conveying means for conveyance in the normal direction and the same can be conveyed to the other outlet by driving the conveying means for conveyance in the reverse direction. Thus, the granular material can be supplied to the two granular material using apparatuses.

Since the granular material supply system is provided with the filtering means for sucking and collecting fine particles produced in the common pressure case, fine particles accumulates scarcely in the common pressure case and work for cleaning the interior of the common pressure case is reduced.

What is claimed is:

1. A granular material supply system for a closed system, for supplying a granular material to a granular material using apparatus without opening the closed system to an external environment, said granular material supply system comprising:

a granular material supply unit holding a granular material;

a granular material feed unit that receives the granular material from the granular material supply unit and feeds the granular material, wherein the granular material feed unit includes:

a pressure case provided with an inlet connected to the granular material supply unit and an outlet for feeding the granular material, and a conveying means disposed in the pressure case to convey the granular material received through the inlet to the outlet;

a weighing means for weighing the granular material being conveyed by the conveying means is disposed in the pressure case;

the conveying means includes a belt conveyor having a plurality of carrier rollers and a conveyor belt supported on the carrier rollers;

the granular material supplied onto the belt conveyor through the inlet is conveyed by the belt conveyor; and the weighing means weighs the granular material on a part of the conveyor belt between the two adjacent carrier rollers installed at positions other than those directly below the inlet.

2. The granular material supply system for a closed system according to claim 1, wherein the granular material is delivered through the inlet onto and is carried by the belt conveyor, and the outlet is located below one end part of the belt conveyor.

3. The granular material supply system for a closed system according to claim 1, wherein the pressure case is a pressure vessel essentially consisting of a cylindrical body and a pair of end plates closing the opposite ends of the cylindrical body, and capable of withstanding a positive pressure or a negative pressure.

4. The granular material supply system for a closed system according to claim 1, wherein a gas blowing means for blowing an inert gas into the pressure case to move the granular material fallen off the conveying means in the pressure case or to purge the pressure case of gases.

5. The granular material supply system for a closed system according to claim 1, wherein the granular material supply unit includes one granular material supply hopper, a granular material supply line provided with a stop valve means is connected to a lower part of the granular material supply hopper.

6. The granular material supply system for a closed system according to claim 1, wherein the granular material supply unit includes a plurality of granular material supply hoppers, the pressure case is provided with a plurality of inlets connected to the plurality of granular material supply hoppers, respectively; and granular material supply lines each provided with a stop valve means are connected to lower parts of the granular material supply hoppers, respectively.

7. The granular material supply system for a closed system according to claim 6, wherein each of the granular material supply hoppers is provided with a gas discharging means for discharging gases from the granular material supply hopper, and a purging gas blowing means for blowing a purging gas into the granular material supply hopper.

8. The granular material supply system for a closed system according to claim 1, wherein a granular material feed line connected to the outlet of the pressure case is provided with a stop valve means.

9. A granular material supply system for a closed system, for supplying a granular material to a granular material using apparatus without opening the closed system to an external environment, said granular material supply system comprising:

a plurality of granular material supply units for holding and supplying granular materials of a plurality of kinds;

a common pressure case provided with a plurality of inlets connected to the plurality of granular material supply units, respectively, and at least one outlet through which the granular materials are fed; and a common conveying means disposed in the common pressure case to convey the granular materials supplied through the plurality of inlets to the outlet, wherein each of the granular material supply units includes:

a hopper for holding the granular material;

a pressure case provided with an inlet connected to a granular material supply line connected to the hopper, and an outlet connected to the inlet of the common pressure case; and a conveying means disposed in the pressure case to convey the granular material delivered thereto to the outlet.

10. The granular material supply system for a closed system according to claim 9, wherein the common conveying means is a belt conveyor, and the conveying means are belt conveyors.

11. The granular material supply system for a closed system according to claim 9, wherein the common pressure case is a pressure vessel essentially consisting of a cylindrical body and a pair of end plates closing the opposite ends of the cylindrical body.

12. The granular material supply system for a closed system according to claim 9, wherein each pressure case is a pressure vessel essentially consisting of a cylindrical body and a pair of end plates closing the opposite ends of the cylindrical body.

13. The granular material supply system for a closed system according to claim 9, wherein a weighing means for weighing the granular material being conveyed by the conveying means is disposed in each pressure case.

14. The granular material supply system for a closed system according to claim 9, wherein the common pressure case is provided with outlets in opposite end parts thereof and the common conveying means is capable of conveying the granular materials selectively in the normal or reverse direction.

15. The granular material supply system for a closed system according to claim 9 further comprising a filtering means capable of sucking and collecting fine particles produced in the common pressure case.

16. The granular material supply system for a closed system according to claim 9, wherein a weighing means for weighing the granular material being conveyed by the conveying means is disposed in the pressure case;

the conveying means includes a belt conveyor having a plurality of carrier rollers and a conveyor belt supported on the carrier rollers;

the granular material supplied onto the belt conveyor through the inlet is conveyed by the belt conveyor; and the weighing means weighs the granular material on a part of the conveyor belt between the two adjacent carrier rollers installed at positions other than those directly below the inlet.

17. The granular material supply system for a closed system according to claim 9, wherein each of the granular material supply hoppers is provided with a gas discharging means for discharging gases from the granular material supply hopper, and a purging gas blowing means for blowing a purging gas into the granular material supply hopper.

* * * * *